(12) United States Patent
Watanabe

(10) Patent No.: US 10,622,010 B2
(45) Date of Patent: Apr. 14, 2020

(54) CONTROL VALUE SETTING METHOD OF THERMAL ACTUATOR FOR MAGNETIC DISK DEVICE

(71) Applicants: Kabushiki Kaisha Toshiba, Minato-ku, Tokyo (JP); Toshiba Electronic Devices & Storage Corporation, Minato-ku, Tokyo (JP)

(72) Inventor: Toru Watanabe, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/266,141

(22) Filed: Feb. 4, 2019

(65) Prior Publication Data

US 2020/0051587 A1 Feb. 13, 2020

(30) Foreign Application Priority Data

Aug. 13, 2018 (JP) .................................. 2018-152429

(51) Int. Cl.
*G11B 5/09* (2006.01)
*G11B 5/012* (2006.01)
*G11B 5/00* (2006.01)

(52) U.S. Cl.
CPC ...... *G11B 5/012* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 7,180,692 B1 * | 2/2007 | Che ..................... | G11B 5/6005 360/31 |
| 7,440,219 B2 | 10/2008 | Zhu et al. | |
| 7,619,847 B2 | 11/2009 | Takahashi | |
| 8,638,349 B1 * | 1/2014 | Liu ........................ | G11B 5/607 346/78 |
| 9,001,453 B1 * | 4/2015 | Knigge .................. | G11B 5/607 360/75 |
| 9,928,873 B1 * | 3/2018 | Liu ........................ | G11B 21/21 |
| 2008/0130159 A1 * | 6/2008 | Dieron ................. | G11B 5/6005 360/75 |
| 2009/0154003 A1 * | 6/2009 | Mathew ............... | G11B 5/6029 360/75 |
| 2013/0335852 A1 * | 12/2013 | Murthy .................. | G11B 5/607 360/75 |

FOREIGN PATENT DOCUMENTS

JP 2003-317415 A 11/2003

* cited by examiner

*Primary Examiner* — Peter Vincent Agustin
(74) *Attorney, Agent, or Firm* — White & Case LLP

(57) ABSTRACT

According to one embodiment, curve fitting, which uses power supplied to the thermal actuator when a magnetic head is brought into contact with a magnetic disk by the thermal actuator and a quadratic or higher curve, is performed at at least five radial positions in a radial direction of the magnetic disk in a case of setting a control value of the thermal actuator, and it is determined as abnormal contact detection when a Z value of an RMS of a fitting residual from the quadratic or higher curve of each power exceeds a predetermined value.

6 Claims, 10 Drawing Sheets

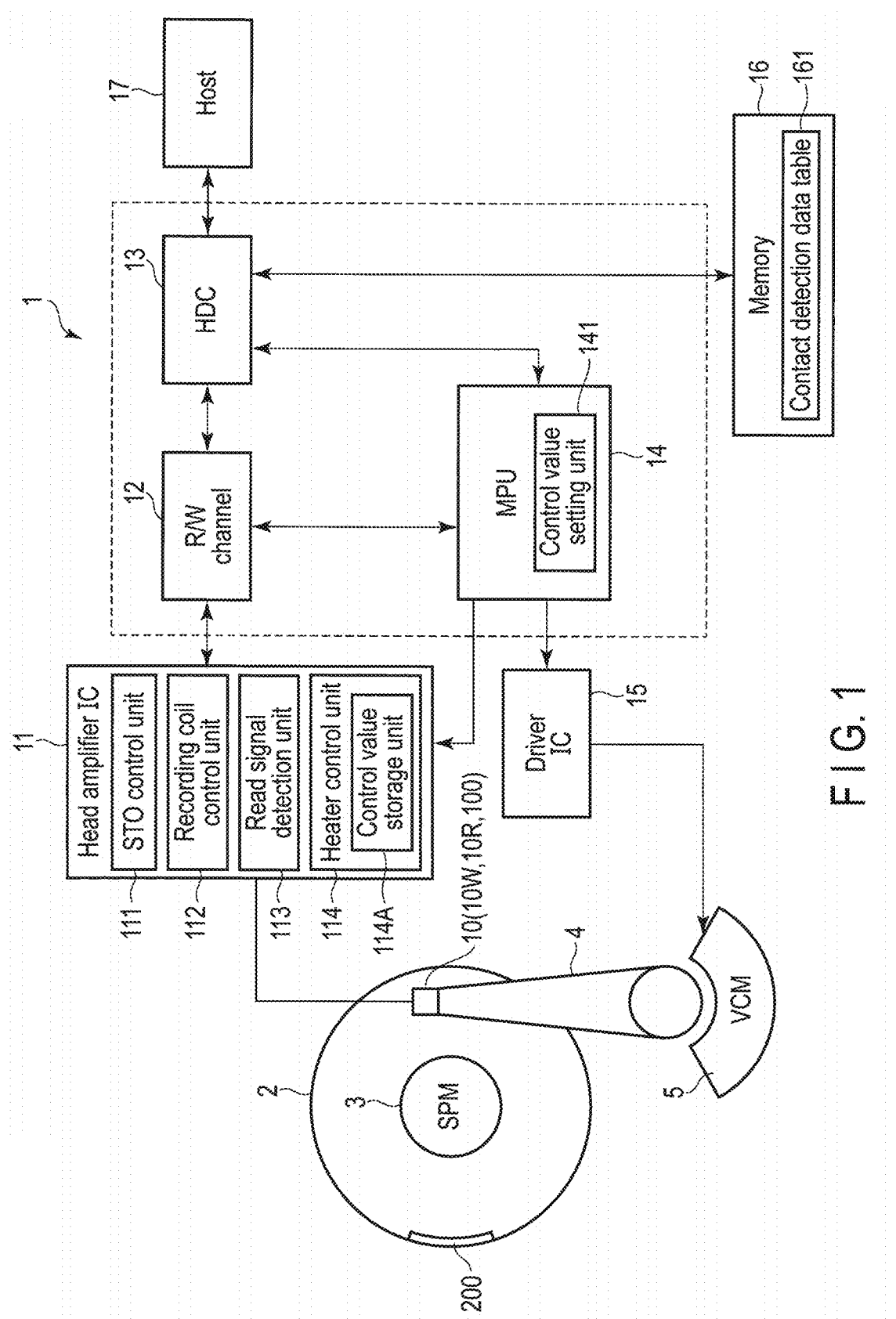
F I G. 1

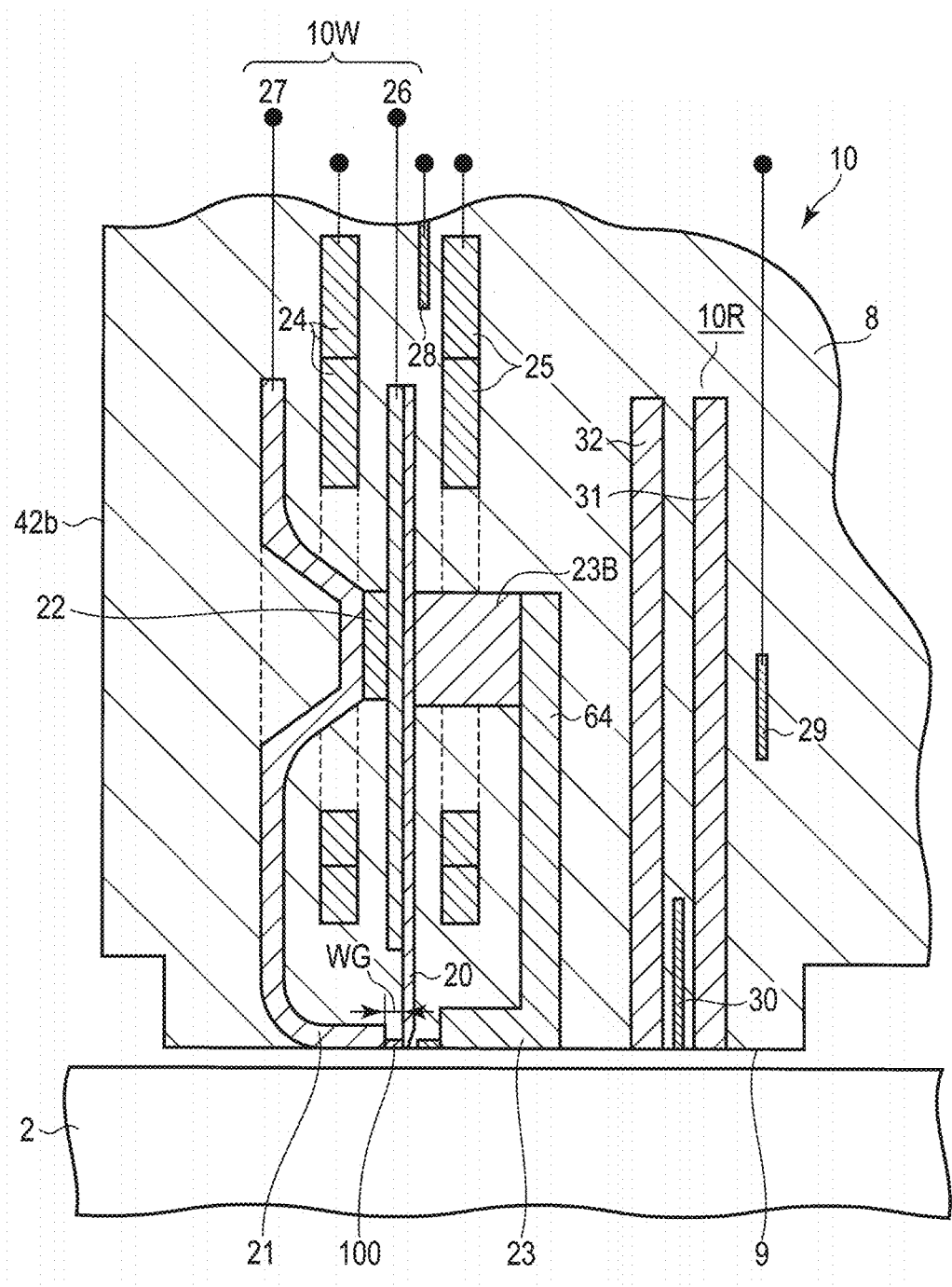
F I G. 2

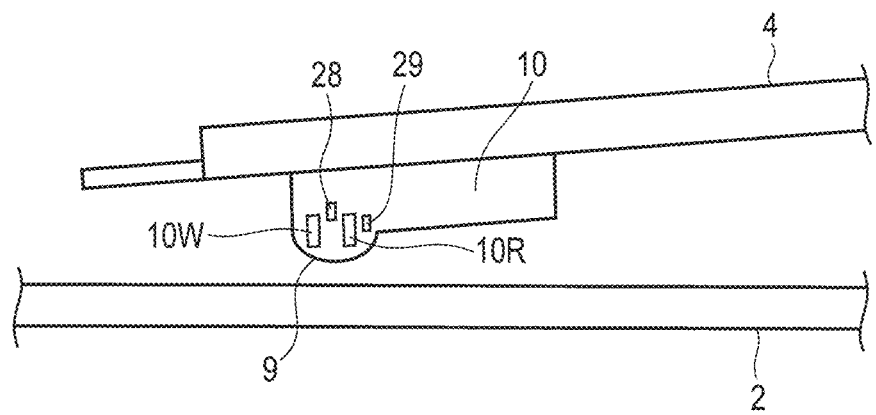
F I G. 3A
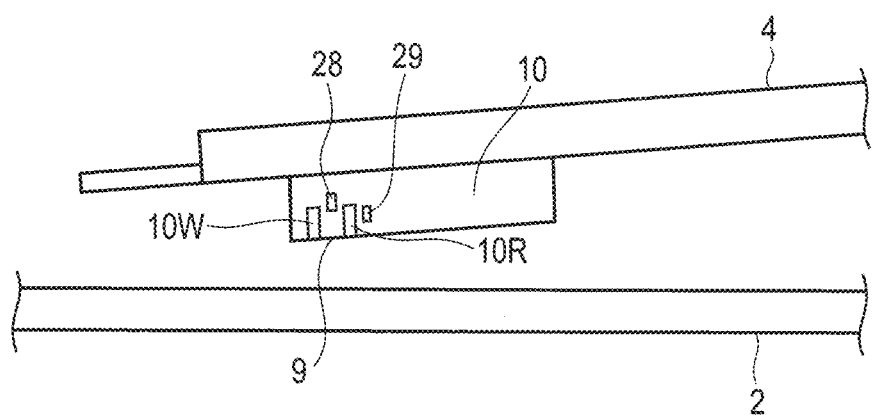
F I G. 3B

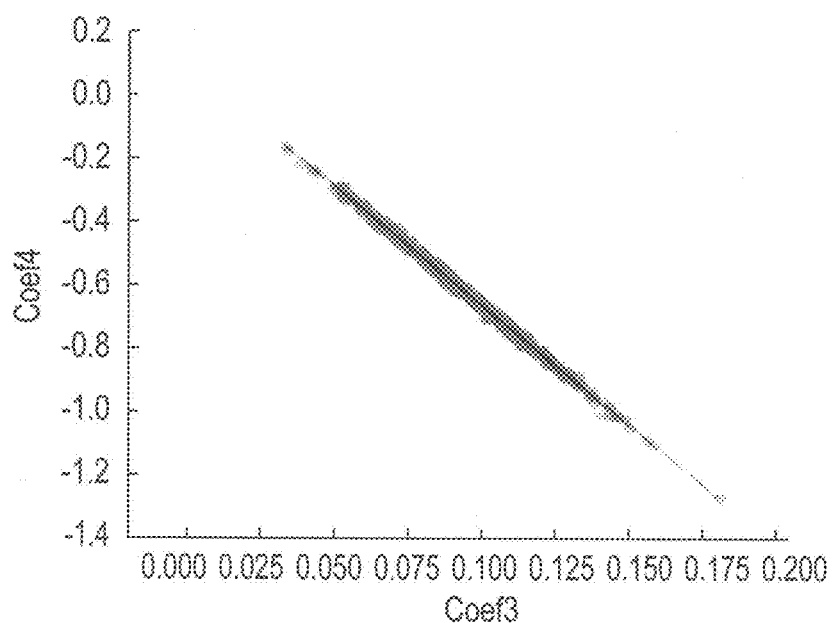
F I G. 8
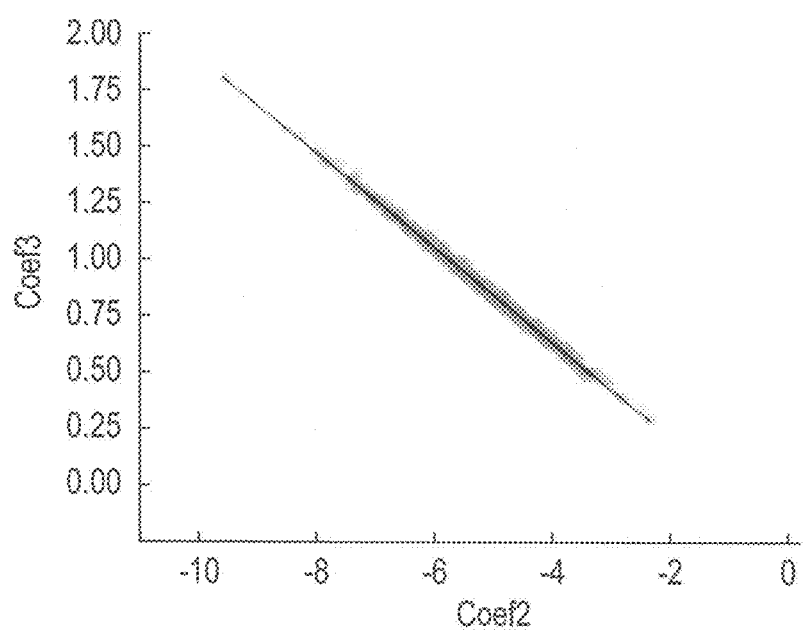
F I G. 9

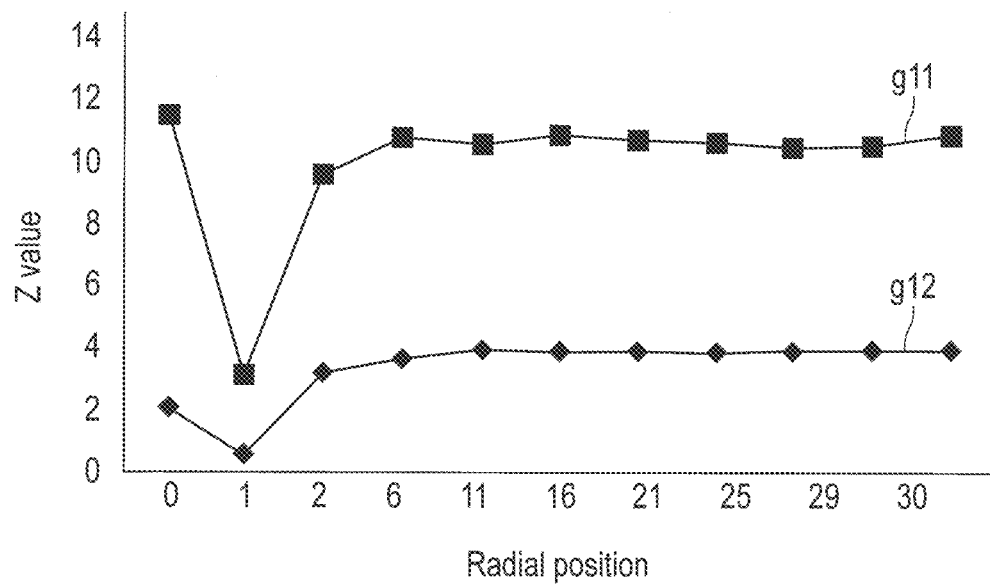
F I G. 14
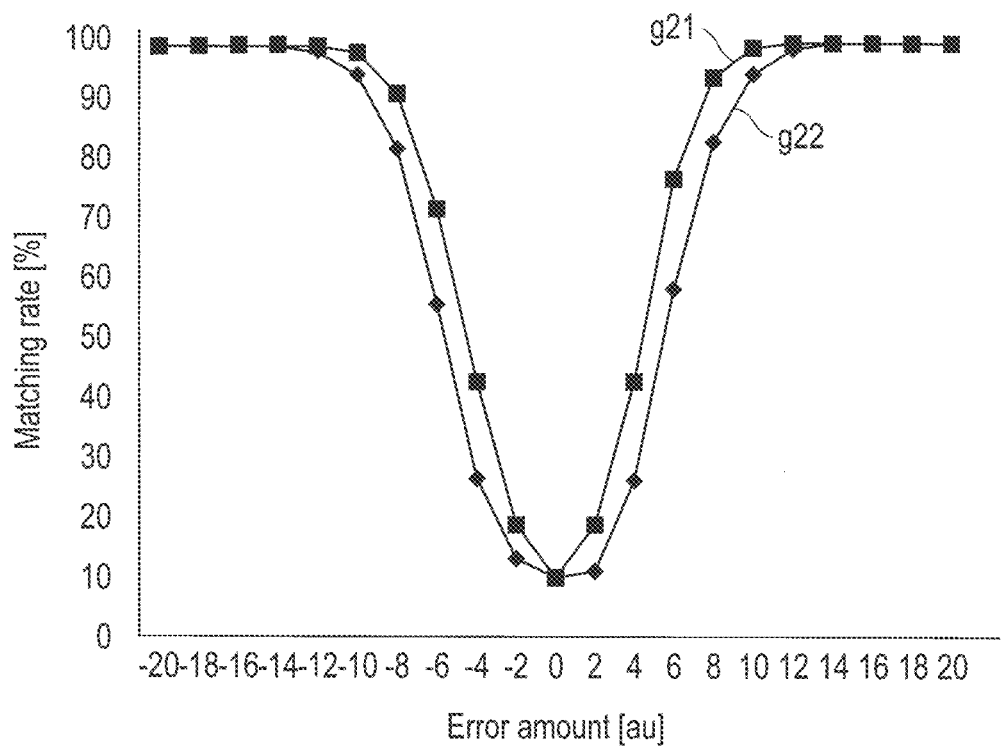
F I G. 15

CONTROL VALUE SETTING METHOD OF THERMAL ACTUATOR FOR MAGNETIC DISK DEVICE

CROSS-REFERENCE TO RELATED APPLICATIONS

This application is based upon and claims the benefit of priority from Japanese Patent Application No. 2018-152429, filed Aug. 13, 2018, the entire contents of which are incorporated herein by reference.

FIELD

Embodiments described herein relate generally to a control value setting method of a thermal actuator for a magnetic disk device.

BACKGROUND

In conventional magnetic disk devices, when abnormal contact between a magnetic head and a recording medium is detected at the time of setting a control value of a thermal actuator, a trial to detect contact is performed several times at the same radial position on a magnetic disk to make contact until variations of detection results become a certain value or smaller, thereby determining presence or absence of abnormal contact detection.

Meanwhile, contact detection is shifted due to a habit of an algorithm depending on a contact detection method so that it is difficult to eliminate a situation where the contact detection is erroneous although repetitive reproducibility is good. In addition, it is possible to perform control to make a gap between the magnetic head and the recording medium more constant if using a high-order function (polynomial), but it is difficult to accurately determine the abnormal contact detection only with a fitting error obtained by performing fitting using the high-order function when there is abnormal contact between the magnetic head and the recording medium.

An object to be solved by the invention is to provide a control value setting method of a thermal actuator for a magnetic disk device capable of accurately detecting abnormal contact when setting a control value of the thermal actuator for the magnetic disk.

BRIEF DESCRIPTION OF THE DRAWINGS

FIG. 1 is a diagram illustrating an example of a schematic configuration of a magnetic disk device according to an embodiment;

FIG. 2 is a cross-sectional view illustrating an example of a structure of a head according to the same embodiment;

FIGS. 3A and 3B are views for describing, in detail, an example of adjustment of a flying height according to the same embodiment;

FIG. 8 is a graph illustrating an example of a correlation between coefficients according to the same embodiment;

FIG. 9 is a graph illustrating an example of a correlation between coefficients according to the same embodiments;

FIG. 14 is a graph illustrating an example of abnormal contact detection by an evaluation function according to the same embodiment; and FIG. 15 is a graph illustrating an example of abnormal contact position detection with respect to an error amount according to the same embodiment.

DETAILED DESCRIPTION

Figure 4:
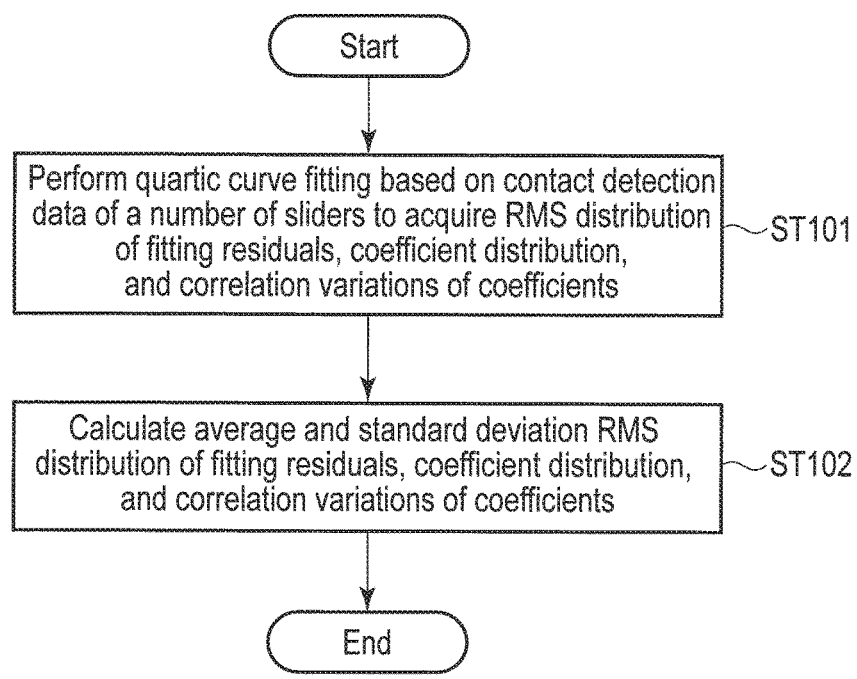
FIG. 4 is a flowchart illustrating an example of a process of acquiring contact detection data according to the same embodiment.

In general, according to one embodiment, a control value setting method of a thermal actuator for a magnetic disk device performs the following processing. In the case of setting a control value of the thermal actuator, curve fitting using power supplied to the thermal actuator when a magnetic head is brought into contact with a magnetic disk by the thermal actuator and a quadratic or higher function is performed at at least five radial positions or more in a radial direction of the magnetic disk. Further, when a Z value of an RMS of a fitting residual from the quadratic or higher function of each power exceeds a predetermined value, it is determined as abnormal contact detection.

Hereinafter, the embodiment will be described with reference to the drawings. Incidentally, the disclosure is merely an example, and the invention is not limited by the contents described in the following embodiment. It is a matter of course that modifications easily conceivable by those skilled in the art are included in the scope of the disclosure. A size, a shape, and the like of each part are sometimes changed from those of an actual embodiment and schematically represented in the drawings in order to further clarify the description. In the drawings, corresponding elements are denoted by the same reference numerals, and a detailed description thereof is omitted in some cases.

FIG. 1 is a block diagram of a magnetic disk device according to the embodiment.

As illustrated in FIG. 1, a magnetic disk device 1 is configured as, for example, a hard disk drive (HDD), and includes a magnetic disk (hereinafter referred to as a "disk") 2, a spindle motor (SPM) 3, a thermal actuator 4, a voice coil motor (VCM) 5, a magnetic head (hereinafter referred to as a "head") 10, a head amplifier IC 11, an R/W channel 12, a hard disk controller (HDC) 13, a microprocessor (MPU) 14, a driver IC 15, and a memory 16. In addition, the magnetic disk device 1 can be connected to a host 17. The head 10 includes a write head (writer) 10W, a read head (reader) 10R, and a spin-torque oscillator (STO) 100, which is a high-frequency oscillator, as will be described in detail later. Incidentally, the R/W channel 12, the HDC 13, and the MPU 14 may be incorporated in a single-chip integrated circuit.

The disk 2 has, for example, a substrate formed in a disk shape and made of a nonmagnetic material. A soft magnetic layer made of a material exhibiting soft magnetic characteristics as an underlayer, a magnetic recording layer having magnetic anisotropy in a direction perpendicular to a disk surface on an upper layer portion of the soft magnetic layer, and a protective film layer on an upper layer portion of the magnetic recording layer are stacked in each surface of the substrate in the described order. Here, a direction of the head 10 is defined as an upper layer.

The disk 2 is fixed to the spindle motor (SPM) 3 and is rotated at predetermined speed by the SPM 3. Incidentally, the plurality of the disks 2 may be installed in the SPM 3 without being limited to the single disk. The SPM 3 is driven by a drive current (or a drive voltage) supplied from the driver IC 15. In the disk 2, a data pattern is recorded and read by the head 10. The disk 2 has a monitor region (evaluation region) 200. The monitor region 200 is a dedicated region for evaluating oscillation characteristics of the STO 100. The monitor region 200 is provided, for example, in a part of the outermost circumference or the innermost circumference in the radial direction of the disk 2.

The thermal actuator 4 is rotatably installed, and the head 10 is supported at a distal end portion of the thermal actuator 4. As the thermal actuator 4 is rotated by the voice coil motor (VCM) 5, the head 10 is moved and positioned onto a desired track of the disk 2. The VCM 5 is driven by a drive current (or a drive voltage) supplied from the driver IC 15.

The head 10 has a slider 8, the write head 10W formed on the slider 8, and the read head 10R (see FIG. 2). The plurality of heads 10 is provided in accordance with the number of the disks 2.

The head amplifier IC 11 includes circuits relating to driving of the STO 100, detection of oscillation characteristics, and the like. For example, the head amplifier IC 11 includes an STO control unit 111, a recording coil control unit 112, a read signal detection unit 113, and a heater control unit 114 including a control value storage unit 114A. The head amplifier IC 11 executes driving of the STO 100, drive signal detection, and the like. Further, the head amplifier IC 11 supplies a write signal (write current) corresponding to write data supplied from the R/W channel 12 to the write head 10W. In addition, the head amplifier IC 11 amplifies a read signal output from the read head 10R and transmits the amplified read signal to the R/W channel 12.

The STO control unit 111 controls a current to be supplied to the STO 100 of the write head 10W.

The recording coil control unit 112 includes a recording signal pattern control unit and a recording current control unit. The recording coil control unit 112 controls a recording current to be supplied to a coil of the write head 10W according to a write signal.

The read signal detection unit 113 detects a signal (read data) read by the read head 10R.

The heater control unit 114 controls power supply to a heater which will be described later. That is, the heater control unit 114 switches ON/OFF of the heater. The control value storage unit 114A stores a control value for keeping a gap between the head 10 and the disk 2 constant in the radial direction. Details of the control value will be described later.

The R/W channel 12 is a signal processing circuit that processes signals relating to read/write. The R/W channel 12 includes a read channel that executes signal processing of read data and a write channel that executes signal processing of write data. The R/W channel 12 converts read signal into digital data and demodulates the read data from the digital data. The R/W channel 12 encodes write data transferred from the HDC 13, and transfers the encoded write data to the head amplifier IC 11.

The HDC 13 controls write of data to the disk 2 and read of data from the disk 2 via the head 10, the head amplifier IC 11, the R/W channel 12, and the MPU 14. The HDC 13 constitutes an interface between the magnetic disk device 1 and the host 17 and executes transfer control of read data and write data. That is, the HDC 13 functions as a host interface controller that receives a signal transferred from the host 17 and transfers the signal to the host 17. When transferring the signal to the host 17, the HDC 13 executes an error correction process on data of the read signal read and demodulated by the head 10 according to the MPU 14. In addition, the HDC 13 receives a command (a write command, a read command, or the like) transferred from the host 17, and transmits the received command to the MPU 14.

The MPU 14 is a main controller of the magnetic disk device 1 and executes servo control necessary for control of the read/write operation and positioning of the head 10. Further, the MPU 14 includes a control value setting unit 141 that sets a control value when the heater control unit 114 controls the thermal actuator 4 in the control value storage unit 114A. The control value setting unit 141 is executed by firmware (program), for example. The process of storing the control value in the control value storage unit 114A performed by the control value setting unit 141 will be described later (see FIG. 5).

The driver IC 15 controls driving of the SPM 3 and the VCM 5 under the control of the MPU 14. The head 10 is positioned on a target track on the disk 2 by driving the VCM 5.

The memory 16 includes a volatile memory and a non-volatile memory. For example, the memory 16 includes a buffer memory formed using a DRAM, and a flash memory. The memory 16 stores a program and a parameter necessary for the processing of the MPU 14. In addition, the memory 16 includes a contact detection data table 161 storing contact detection data. Here, the contact detection data is data relating to contact between a large number of heads and a disk although details thereof will be described later (see FIG. 4). For example, the contact detection data is transmitted from the host 17 and stored in the contact detection data table 161.

Next, a configuration of the head 10 will be described in detail.

FIG. 2 is a cross-sectional view illustrating an example of the structure of the head 10. First, the head 10 includes the write head 10W and the read head 10R formed at the end of the slider 8 by a thin film process, and is formed as a separate type head as illustrated in FIG. 2. The slider 8 has an air bearing surface (ABS) 9 which is a surface facing a recording surface of the disk 2 so as to float from the recording surface of the disk 2. The write head 10W writes data onto the magnetic disk 2. The read head 10R reads the data recorded on the magnetic disk 2.

The write head 10W includes a main magnetic pole 20, a return magnetic pole 21, a non-conductor 22, a leading magnetic pole 23, a connecting portion 23B, a first recording coil 24, a second recording coil 25, a first terminal 26, a second terminal 27, and the STO 100. The main magnetic pole 20, the return magnetic pole 21, and the leading magnetic pole 23 are formed using a highly magnetic-permeable material. The main magnetic pole 20 and the return magnetic pole 21 constitute a first magnetic core forming a closed magnetic path, and the first recording coil 24 is wound around the first magnetic core. In addition, the main magnetic pole 20 and the leading magnetic pole 23 constitute a second magnetic core forming a closed magnetic path, and the second recording coil 25 is wound around the second magnetic core.

The main magnetic pole 20 generates a recording magnetic field in a direction perpendicular to the recording surface (recording layer) of the disk 2. The main magnetic pole 20 is formed so as to extend substantially perpendicularly to the recording surface of the disk 2. A distal end portion of the main magnetic pole 20 on the disk 2 side is tapered down toward the disk surface. A part of the distal end portion of the main magnetic pole 20 is exposed to the ABS 9 of the slider 8. A first terminal 26 configured to supply a current is connected to the main magnetic pole 20. For example, a direct current is supplied to the first terminal 26.

The return magnetic pole 21 is formed in a substantially L shape of which a distal end portion on the disk 2 side is bent toward the main magnetic pole 20. The distal end portion of the return magnetic pole 21 faces the distal end portion of the main magnetic pole 20 with a write gap WG therebetween. The return magnetic pole 21 has a projecting portion at a position separated from the disk 2, and this projecting portion is connected to the main magnetic pole 20 via the non-conductor 22. The first recording coil 24 is wound around the projecting portion. A second terminal 27 configured to cause a current to flow is connected to the return magnetic pole 21. For example, a direct current is supplied to the second terminal 27, which is similar to the first terminal 26.

The STO 100 is installed between the distal end portion of the main magnetic pole 20 and the distal end portion of the return magnetic pole 21 within the write gap WG. The STO 100 is formed in a substantially rectangular parallelepiped shape of a stacked structure of a magnetic film and a nonmagnetic film by microfabricating a magnetoresistive film. A distal end surface of the main magnetic pole 20, a distal end surface of the return magnetic pole 21, and a surface formed by the STO 100 are exposed at the ABS 9 and are arranged to face the recording surface of the disk 2. The STO 100 is electrically connected to the main magnetic pole 20 and the return magnetic pole 21 via a nonmagnetic conductive layer. As a result, an energizing circuit energizing through the main magnetic pole 20, the STO 100, and the return magnetic pole 21 is formed. When a current, for example, a direct current is applied in the stacking direction to the STO 100, a spin in a ferromagnet included in the element undergoes precession movement due to a magnet property of an electron. The STO 100 oscillates by a microwave band AC signal (high-frequency magnetic field) due to such precession movement. The ON/OFF of oscillation of the STO 100 is controlled by the STO control unit 111 and the recording coil control unit 112 under the control of the MPU 14.

The leading magnetic pole 23 is formed using a soft magnetic material. The leading magnetic pole 23 is arranged on a side opposite to the return magnetic pole 21 with respect to the main magnetic pole 20, that is, on a leading side of the main magnetic pole 20. The leading magnetic pole 23 is formed in a substantially L shape and has a distal end portion facing the distal end portion of the main magnetic pole 20 with a gap therebetween. An upper end portion of the leading magnetic pole 23 that is separated from the disk 2 is connected to the main magnetic pole 20 by the connecting portion 23B made of a magnetic material. The second recording coil 25 is wound around the connecting portion 23B.

The first recording coil 24 and the second recording coil 25 are wound in directions opposite to each other. The first recording coil 24 and the second recording coil 25 are connected in series via the head amplifier IC 11. The control of current supply to the first recording coil 24 and the second recording coil 25 is performed by the recording coil control unit 112. Incidentally, the current supply to the first recording coil 24 and the second recording coil 25 may be separately controlled. The main magnetic pole 20 is excited as an AC current flows to the first recording coil 24 and the second recording coil 25.

The read head 10R has a magnetic film 30 having a magnetoresistance effect and shield films 31 and 32 arranged so as to sandwich the magnetic film 30 on a trailing side and a leading side of the magnetic film 30. Lower ends of the magnetic film 30 and the shield films 31 and 32 are exposed at the ABS 9 of the slider 8.

As illustrated in FIG. 2, the head 10 includes a first heater 28 and a second heater 29 which function as heat generating elements. The first and second heaters 28 and 29 are embedded in the slider 8. The first heater 28 is arranged, for example, between the first recording coil 24 and the second recording coil 25 above the main magnetic pole 20. The second heater 29 is arranged, for example, on a side of the shield film 31.

The first and second heaters 28 and 29 are connected to the heater control unit 114 of the head amplifier IC 11. When a current is supplied to the first and second heaters 28 and 29 from the heater control unit 114, the first and second heaters 28 and 29 generate heat so as to heat a part of slider 8 surrounding the heaters. As a result, the slider 8, the write head 10W, and the read head 10R are thermally expanded, and the ABS 9 projects to the surface side of the disk 2. In this manner, a flying height of the head 10 (a distance between the ABS 9 of the head 10 and the surface of the disk 2) can be adjusted by the first and second heaters 28 and 29. Each magnitude of the expansion of the slider 8, the write head 10W, and the read head 10R is adjusted by a value of a current (voltage to be applied) to be supplied to the first and second heaters 28 and 29. That is, the flying height of the head 10 is adjusted by the value of the current (the applied voltage) to be supplied to the first and second heaters 28 and 29. Incidentally, the number of heaters is not limited to two, but one or three or more heaters may be provided.

Herein after, an example of adjustment of the flying height of the first and second heaters 28 and 29 will be described in detail with reference to FIGS. 3A and 3B. FIG. 3A is a schematic diagram illustrating a flying height of a head in a state where the first heater 28 and the second heater 29 are in an ON state. FIG. 3B is a schematic diagram illustrating a flying height of a head in a state where the first heater 28 and the second heater 29 are in an OFF state (or in a state where a current to be supplied is smaller than that in a normal recording/reading operation).

As illustrated in FIG. 3A, when the first and second heaters 28 and 29 are energized (ON state) in a state where the head 10 is floating, the head 10 is heated and the ABS 9 moves toward the surface side of the disk 2. As a result, the flying height of the head 10 decreases (as reduced), that is, the distance between the surface of the disk 2 and the ABS 9 decreases to, for example, about 1 nm. It is possible to perform recording or reading of information more favorably by the head 10 on the disk 2 by reducing the flying height. At the same time, a high-frequency magnetic field from the STO 100 can be sufficiently applied to the disk 2 to exhibit a high-frequency assist effect.

As illustrated in FIG. 3B, when the first and second heaters 28 and 29 are not energized (OFF state), the ABS 9 of the head 10 is kept in a substantially flat state without expanding towards the disk 2 side. Therefore, the flying height of the head 10 is large, and the distance between the surface of the disk 2 and the ABS 9 is, for example, about 10 nm. Since the distance between the STO and the disk 2 is large in such a high flying state, the high-frequency magnetic field oscillating by the STO 100 hardly acts on the disk 2 and does not give the assist effect.

Here, the flying height (the gap between the head 10 and the recording surface of the disk 2) depends on a design of the slider 8 on which the head 10 is mounted, and the flying height (gap) can be expressed by a function obtained by considering a radial position on the disk 2. However, it is difficult to make the function as a unique function due to variations of each magnetic disk device or the like. In addition, this function can be expressed by a polynomial function, for example, a quartic function when there are multiple sliders. At this time, variations of the gap caused by the above-described variations or the like can be expressed as variations of a coefficient of the quartic function.

When setting a control value for keeping the head 10 mounted on the slider 8 at a constant flying height from the disk 2 with the thermal actuator 4, first, it is necessary to measure a gap between the head 10 mounted on each slider and the recording surface of the disk 2. Therefore, it is general to cause the thermal actuator 4 perform a write operation or a read operation in order to grasp the flying height and to obtain an operation amount with which the head 10 contacts the disk 2. Although various methods can be considered for such contact detection, there is a case where abnormal contact detection occurs due to influence of shapes and physical properties of the head 10 and the disk 2 in contact with the disk 2 at the time of performing the contact detection. Therefore, in the embodiment, the MPU 14 performs interpolation by a quartic function after confirming whether there is no abnormality in contact detection between the head 10 and the disk 2, and performs a process of storing the control value of the thermal actuator 4 in the control value storage unit 114A of the heater control unit 114. This process will be described hereinafter with reference to FIGS. 4 and 5.

First, the contact detection data stored in the contact detection data table 161 will be described. The contact detection data is data collected by the host 17, transmitted from the host 17 to the magnetic disk device 1, and stored in the memory 16. Here, in the embodiment, the contact detection data refers to data acquired when the head 10 is brought into contact with the disk 2 at eleven positions in the radial direction from the center of the disk 2. The eleven positions are indicated in the order of radial positions P1 to P11 from the center of the disk 2 to the outer side.

The host 17 collects the contact detection data of a number of sliders from a lot of magnetic disk devices in advance, and performs quartic function fitting using the contact detection data to acquire a root mean square (RMS) distribution of fitting residuals, a coefficient distribution, and variations of a correlation between coefficients (inter-coefficient correlation) (ST101). At this time, the host 17 also calculates an average and a standard deviation (of each. item) of the acquired RMS distribution fitting residual, coefficient distribution, and coefficient correlation variation (ST102). These pieces of data are transmitted from the host 17 to the magnetic disk device 1 and stored in the contact detection data table 161 of the memory 16. Although the contact detection data is stored in the memory 16 in the embodiment, but the contact detection data may be stored in any place inside the magnetic disk device 1. In short, it may be sufficient for the MPU 14 to store the contact detection data in a place that can be accessed at the time of performing the process to be described with reference to FIG. 5.

Here, a method of calculating parameters used in this process will be described. Calculation formulas of these parameters are stored, for example, at predetermined positions in the MPU 14, and read and used when the process is required.

The quartic function used in the quartic function fitting (curve fitting) can be expressed by the following Formula (1).

$$f(x) = a_4 x^4 + a_3 x^3 + a_2 x^2 + a_1 x^1 + a_0 a_0 x^0 \quad (1)$$

x: Contact position radius

In addition, an rms of a residual of the quartic function fitting can be expressed by the following Formula (2).

$$\mathrm{rms} = \sqrt{\frac{1}{n}\sum_{i=1}^{n}(y_i - f(x_i))^2} \quad (2)$$

y: Gap at contact detection, i: Radial position number, n: Number of contact detection radial positions Calculation of a Z value of the rms can be expressed by the following Formula (3).

$$Z_{rms} = \frac{(\mathrm{rms} - \mathrm{RMS})}{\sigma_{RMS}} \quad (3)$$

RMS: Average of rms of plurality of sliders, σrms: Standard deviation of rms of plurality of sliders Calculation of a Z value of a coefficient can be expressed by the following Formula (4).

$$Z_{aj} = \frac{(a_j - A_j)}{\sigma_{Aj}} (j = 0, 1, \ldots, k) \quad (4)$$

Aj: Average value of plurality of sliders of j-order coefficient, σAj: Standard deviation of plurality of sliders of j-order coefficient, k: Degree of fitting function (for example, k=4 in the case of the quartic function)

An inter-coefficient correlation formula can be expressed by the following Formula (5).

$$C_{aj}(a_{j-1}) = \alpha_{j-1} a_{j-1} + \beta_{j-1} (j=1, \ldots, k) \quad (5)$$

Caj(aj−1): Predicted value of aj relative to aj−1, α: Inclination of inter-coefficient correlation formula, β: Intercept of inter-coefficient correlation formula A Z value of the inter-coefficient correlation (in the embodiment, a shift amount from an inter-coefficient correlation line is regarded as the Z value) can be expressed by the following Formula (6).

$$Z_{C_{aj}} = \frac{(a_j - C_{aj})}{\sigma_{dC_{aj}}} (j = 1, \ldots, k) \quad (6)$$

σdCaj: Standard deviation. of shifts (aj−Caj) from correlation lines of plurality of heads An evaluation function when determining abnormal contact can be expressed by the following Formula (7).

$$Z_{rms} + \sum_{j=0}^{k} Z_{a_j} + \sum_{j=1}^{k} Z_{C_{aj}} \quad (7)$$

The abnormality determination is made based on whether the evaluation function is the minimum and all the Z values are within s predetermined value.

Next, a process of performing an abnormal contact detection with respect to an arbitrary slider and storing a control value will be described with reference to the flowchart of FIG. 5. This process is executed, for example, based on an instruction from the host 17.

Figure 5:
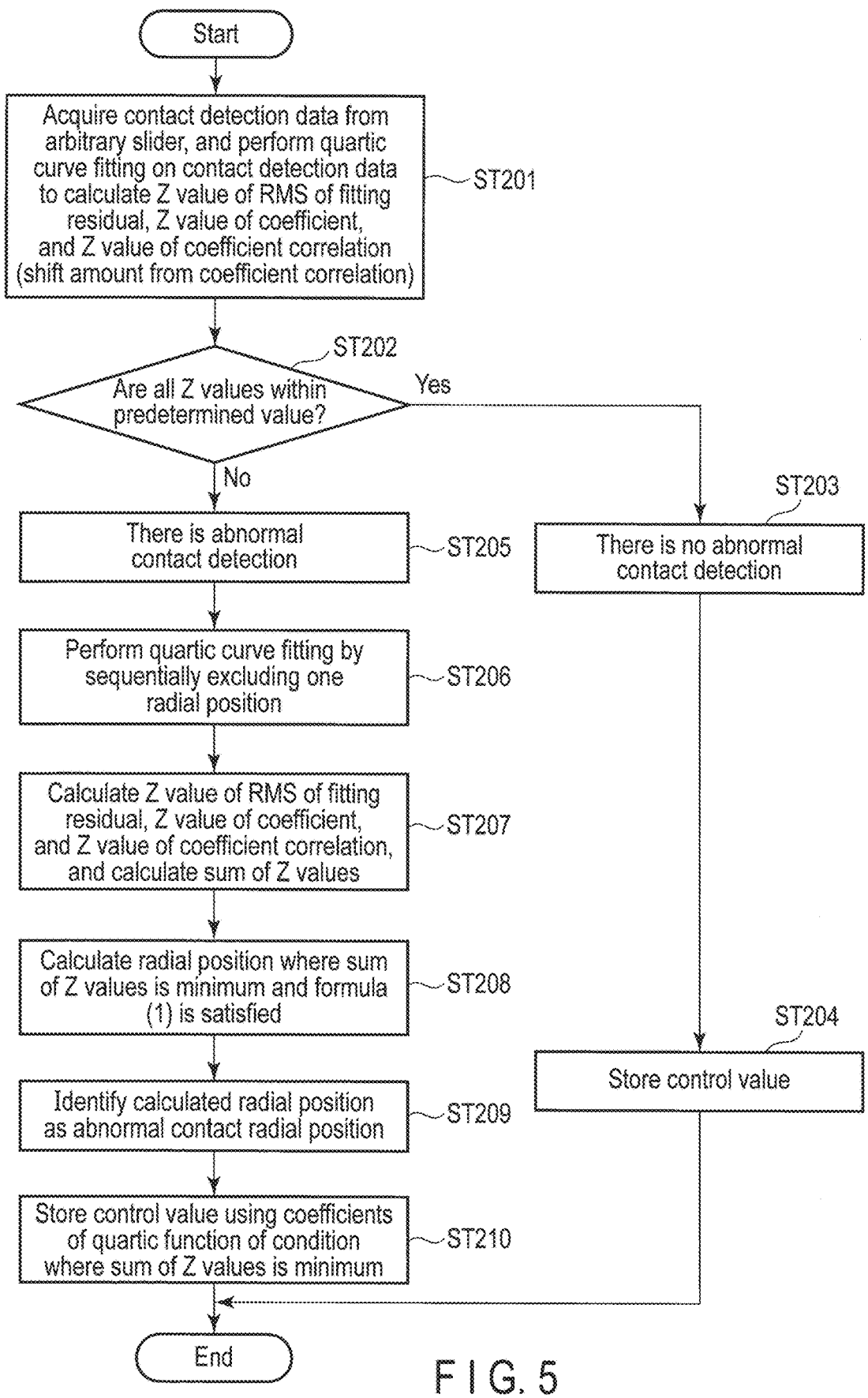
FIG. 5 is a flowchart illustrating an example of an abnormal contact determination process at the time of setting a control value of the thermal actuator according to the same embodiment.

As illustrated in FIG. 5, the MPU 14 performs contact detection with respect to an arbitrary slider, acquires contact detection data of the slider, performs quartic curve fitting on the contact detection data using Formula (1), and calculates a Z value (Z value=(measured value−average value)/standard deviation) of the RMS of a fitting residual, a Z value of a coefficient, and a Z value of an inter-coefficient correlation (shift amount from an inter-coefficient correlation line) (ST201). These values are calculated using the above-described Formulas (3), (4), and (6).

Figure 6:
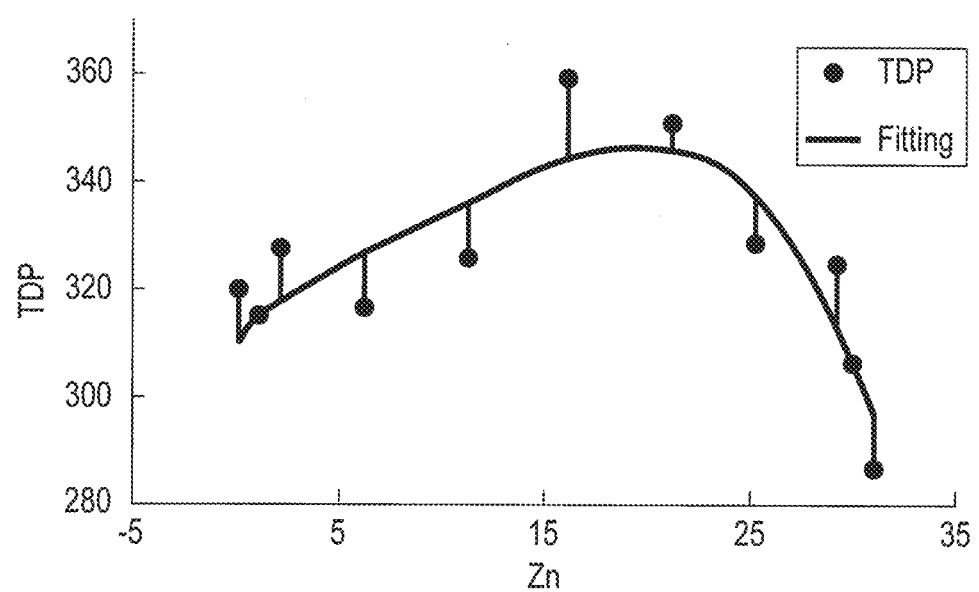
FIG. 6 is a graph illustrating an example of residuals at the time of quartic function fitting according to the same embodiment.
Figure 7:
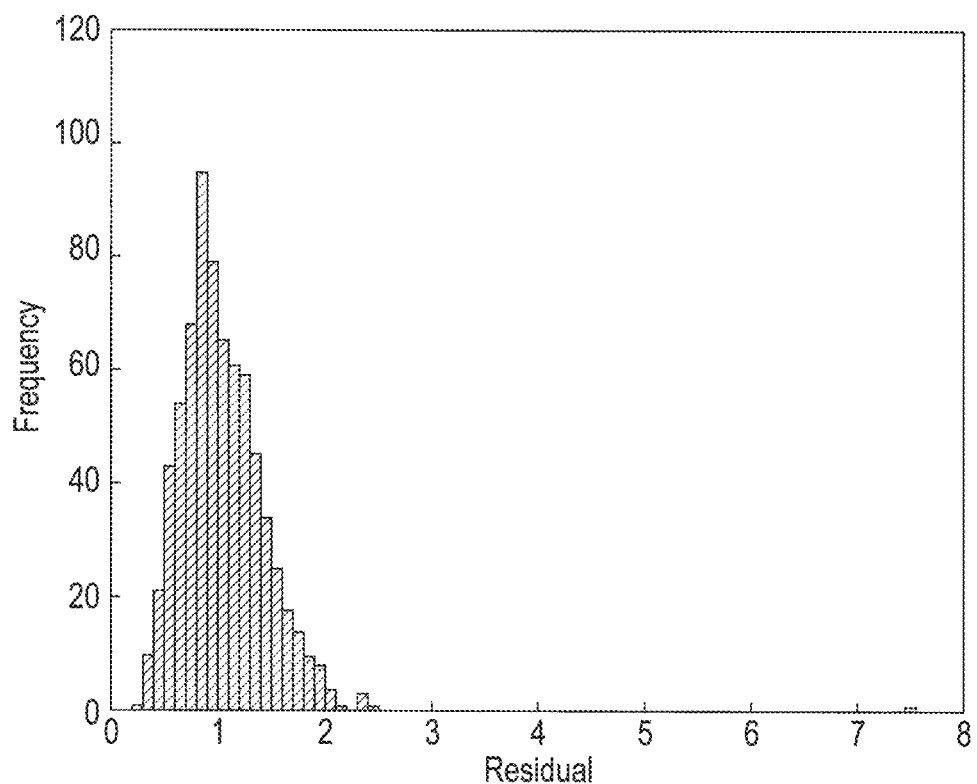
FIG. 7 is a graph illustrating an RMS distribution of residuals when quartic function fitting is performed on a plurality of sliders according to the same embodiment.
Figure 10:
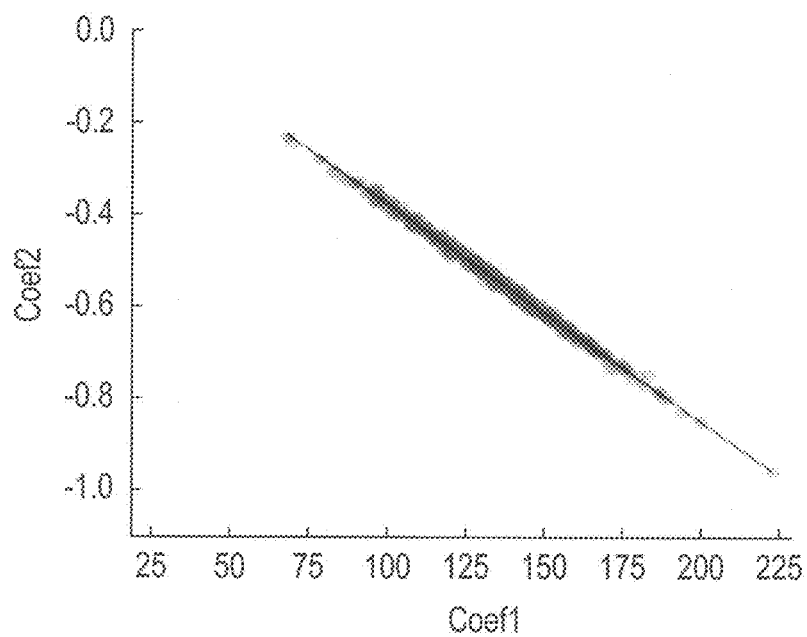
FIG. 10 is a diagram illustrating an example of correlation between coefficients according to the same embodiment.
Figure 11:
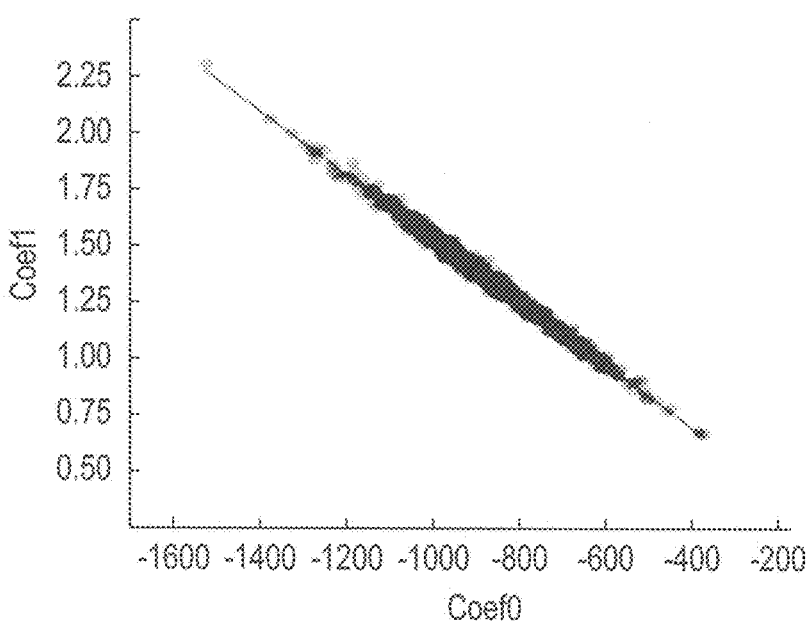
FIG. 11 is a graph illustrating an example of a correlation between coefficients according to the same embodiment.

FIG, 6 is a graph illustrating an example of residuals at the time of the quartic function fitting. In FIG. 6, the vertical axis represents thermal design power consumption (TDP), and the horizontal axis represents a radial position. A state where fitting is performed. for the TDP at eleven radial positions according to the quartic function is illustrated. In addition, FIG. 7 is a graph illustrating the RMS distribution of residuals when performing quartic function fitting on a plurality of sliders. In FIG. 7, the vertical axis represents a frequency and the horizontal axis represents a residual.

Due to the quartic function, there are four inter-coefficient correlations of a4 VS a3, a3 VS a2, a2 VS a1, a1 VS a0 as illustrated in FIGS. 8 to 11. Any of FIGS. 8 to 11 illustrates that there is a correlation between coefficients. The correlation is obtained using the above-described Formula (5). Incidentally, these four coefficients are coefficients of the quartic function expressed by the above-described Formula (1).

Next, the MPU 14 determines whether all three Z values obtained in Step ST201 are within a predetermined value (ST202). Here, the predetermined value is four because the curve fitting is performed with the quartic function in the embodiment. When it is determined that all the three Z values are within the predetermined value (ST202: YES), the MPU 14 determines that there is no abnormal contact detection (ST203) and sets a control value for interpolation by the existing quartic function in the control value storage unit 114A (ST204). Then, the processing for the arbitrary slider selected in Step ST201 is ended.

On the other hand, when it is determined that not all the three Z values are within the predetermined value, that is, that any of the Z values exceeds the predetermined value (ST202: NO), the MPU 14 determines that there is abnormal contact detection (ST205). That is, the MPU 14 determines that abnormal contact with the disk 2 of the head 10 has occurred at any of the eleven radial positions P1 to P11. As a result, the abnormal contact can be accurately detected at the time of setting the control value (coefficients of the quartic function) of the thermal actuator 4. When it is determined that there is the abnormal contact detection (ST205), the MPU 14 executes processing of the following Steps ST206 to ST210.

The MPU 14 needs to determine any radial position among the eleven radial positions P1 to P11 at which the abnormal contact detection has been made. Therefore, in the embodiment, first, the MPU 14 performs quartic curve fitting based on remaining contact detection data excluding one radial position out of the radial positions P1 to P11 on which the contact of the head 10 with the disk 2 has been detected (ST206). Since the contact detection is performed at the eleven positions from the radial position P1 to P11 in the embodiment, the quartic curve fitting based on the contact detection data at the remaining ten positions obtained by sequentially removing one radial position one by one from the radial position P1 to P11 is sequentially performed. For example, in the case of determining whether there is abnormal contact detection at the radial position P2, the quartic curve fitting is performed using the contact detection data at the radial positions (P1, P3, P4, P5, P6, P7, P8, P9, P10, and P11).

Next, the MPU 14 calculates the Z value (Z value= (measured value−average value)/standard deviation) of the RMS of the fitting residual, the Z value of the coefficient, the Z value of the inter-coefficient correlation (in the embodiment, the shift amount from the inter-coefficient correlation line is regarded as the Z value) with the quartic curve fitting at each radial position, and further calculates the sum of the Z values (ST207).

Next, the MPU 14 calculates a radial position where the sum of the Z values is the minimum and the above-described Formula (1) is satisfied from among the radial positions P1 to P11 based on a result of Step ST207 (ST208), and identifies the calculated radial position as a position of the abnormal contact (ST209). As a result, the radial position where the head 10 abnormally contacts the disk 2 is identified from among the radial positions P1 to P11. Then, the MPU 14 stores the coefficients of the quartic function of the condition where the sum of the Z values is the minimum in the control value storage unit 114A (ST210). As a result, it is possible to store the most appropriate Formula (1) in the control value storage unit 114A based on the contact detection data excluding the radial position at which the abnormal contact is made. Then, the processing for the arbitrary slider selected in Step ST201 is ended.

Figure 12:
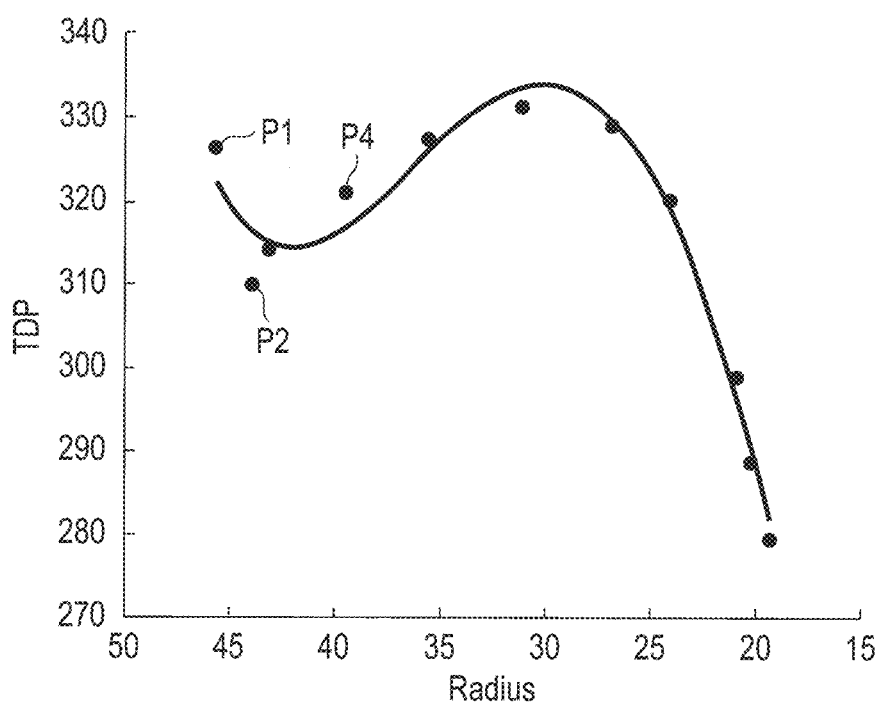
FIG. 12 is a graph for describing an example of a case of performing quartic function fitting including an abnormal contact radial position according to the same embodiment.

Next, an example of an effect in the case where the quartic function fitting is performed excluding the abnormal contact radial position as described above will be described. FIG. 12 is a view for describing an example in the case of performing the quartic function fitting including the abnormal contact radial position, and FIG. 13 illustrates an example in the case where the quartic function fitting is performed excluding the abnormal contact radial position.

Figure 13:
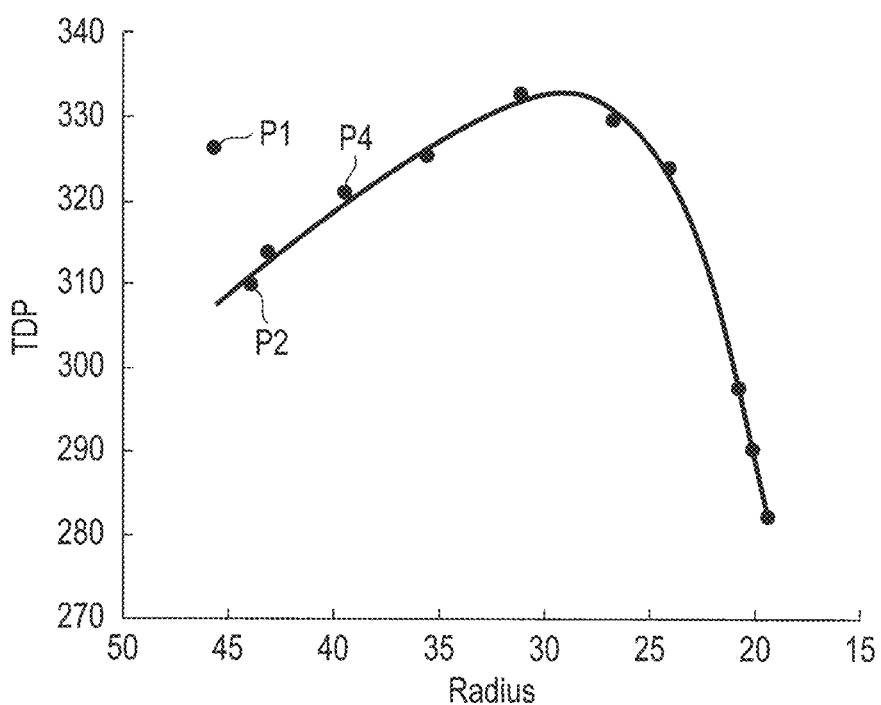
FIG. 13 is a graph for describing an example of a case of performing quartic function fitting excluding the abnormal contact radial position according to the same embodiment.

In FIGS. 12 and 13, the vertical axis represents TDP, the horizontal axis represents a radial position, and it is assumed that values at the eleven radial positions are plotted (reference signs indicating the radial positions other than P1, P2, and P4 are not illustrated) and a value of the radial position P1 is the abnormal contact radial position.

In FIG. 12, the coefficients of the quartic function of Formula (1) including the radial position P1 which is the abnormal contact radial position have been set, and thus, radial positions separated from the quartic function fitting occur at the other radial positions P2 and P4. On the other hand, in FIG. 13, the coefficients of the quartic function of Formula (1) have been set except for the radial position P1 which is the abnormal contact radial position. Therefore, values substantially fit to the quartic function at the other radial positions excluding the radial position P1. That is, the flying height in the radial direction is interpolated using the quartic function fitted to eight radial positions in the example illustrated in FIG. 12, but the flying height in the radial direction is interpolated using the quartic function fitted to ten radial positions in the example illustrated in FIG. 13. Therefore, it is possible to keep the flying height (gap) of the head 10 constant from the disk 2 at any position in the radial direction in the embodiment.

Next, an example of detection of an abnormal contact radial position as compared with the related art will be described.

FIG. 14 is a graph illustrating an example of abnormal contact detection using an evaluation function, which compares the case of the embodiment and the case of the conventional example. In FIG. 14, the vertical axis represents a Z value and the horizontal axis represents a radial position. A graph of the embodiment is a graph g11, and a graph of the related art is a graph g12. In addition, the radial positions P1 to P11 are illustrated (reference signs are omitted in FIG. 14). In the case of the embodiment, a difference in Z value between an abnormal contact position and a normal contact position is larger in the embodiment than that in the conventional example, and a risk of a detection error is reduced.

Next, an example of evaluation of an abnormal contact radial position as compared with the related art will be described.

FIG. 15 is a graph illustrating an example of detection of the abnormal contact radial position with respect an error amount, which compares the case of the embodiment and the case of the conventional example similarly to FIG. 14. In FIG. 15, the vertical axis represents a matching rate of the abnormal contact radial position, and the horizontal axis represents the error amount. A graph of the embodiment is a graph g21, and a graph of the related art is a graph g22. The error amount is smaller in the embodiment than that of the related art. That is, the abnormal contact can be detected with high accuracy.

Although the case where the quartic function expressed by Formula (1) is used as the polynomial function has been described in the above embodiment, the polynomial function is not limited to the quartic function. The polynomial function may be a quadratic or higher function. Incidentally, it is desirable to provide five or more radial positions for contact detection in the case of using the quadratic function, and it is desirable to detect contact at more radial positions than that of the case of using the quadratic function in the case of using a function higher than the quadratic function.

Although the description has been given in the above embodiment regarding the case where whether there is abnormal contact is determined by calculating the sum of the Z values without weighting the standardized Z value of rms, Z value of the coefficient, and Z value of the inter-coefficient correlation (the shift amount from the inter-coefficient correlation), the invention is not limited thereto, and weighting may be applied. In the case of performing the weighting in this manner, for example, it is conceivable to increase a weight of a Z value which is considered to have great influence based on the past experience.

Further, the description has been given in the above embodiment regarding the case where it is determined whether all of the Z value (Z value=(measured value−average value)/standard deviation) of the RMS of the fitting residual, the Z value of the coefficient, and the Z value of the inter-coefficient correlation (the shift amount from the inter-coefficient correlation line) are within the predetermined value (ST202), but the embodiment is not limited thereto. The presence or absence of abnormal contact detection may be determined based on whether at least one Z value among the Z value (Z value=(measured value−average value)/standard deviation) of the RMS of the fitting residual, the Z value of the coefficient, and the Z value of the inter-coefficient correlation (the shift amount from the inter-coefficient correlation line) is within a predetermined value.

Further, the description has been given in the above embodiment regarding the case where the quartic function fitting (curve fitting) is performed by excluding a value of one radial position sequentially from the eleven radial positions P1 to P11, the Z value of the RMS of the fitting residual is evaluated, and the radial position at which the Z value of the RMS is evaluated as the minimum value is determined as the abnormal contact position (ST209), but the embodiment is not limited thereto. For example, the same processing may be performed sequentially by excluding values of two radial positions. In the case of excluding values of two radial positions in this manner, it is possible to determine that a position is the abnormal contact position based on whether a Z value thereof is within six using six as the predetermined value of evaluation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes the form of the embodiments described herein may be made without departing from the spirit of the inventions. The accompanying claims and their equivalents are intended to cover such forms or modifications as would fall within the scope and spirit of the inventions.

What is claimed is:

1. A control value setting method of a thermal actuator for a magnetic disk device, the method comprising:
    performing curve fitting by a control unit of the magnetic disk device, which uses power supplied to the thermal actuator when a magnetic head is brought into contact with a magnetic disk by the thermal actuator and a quadratic or higher function, at least five radial positions in a radial direction of the magnetic disk in a case of setting a control value of the thermal actuator; and
    determining the performance as abnormal contact detection by the control unit when a Z value of an RMS of a fitting residual from the quadratic or higher function of each power exceeds a predetermined value.

2. The control value setting method of the thermal actuator according to claim 1, further comprising
    determining, by the control unit of the magnetic disk device, the abnormal contact detection when a Z value of a coefficient of the function exceeds the predetermined value.

3. The control value setting method of the thermal actuator according to claim 1, further comprising
    determining, by the control unit of the magnetic disk device, the abnormal contact detection when a Z value, which is a shift amount of a distance from an inter-coefficient correlation line of the function, exceeds the predetermined value.

4. The control value setting method of the thermal actuator according to claim 1, wherein
    the curve fitting is performed, by the control unit of the magnetic disk device, by excluding a value of a radial position sequentially for each of the radial positions to evaluate the Z value of the RMS of the fitting residual, and a radial position at which the Z value of the RMS is evaluated as a minimum value is determined as an abnormal contact radial position.

5. The control value setting method of the thermal actuator according to claim 4, wherein the curve fitting is performed, by the control unit of the magnetic disk device, by excluding a value of a radial position sequentially for each of the radial positions to evaluate a sum of the Z value of the RMS of the fitting residual and the Z value of the coefficient of the function, and a radial position at which the sum of the Z values is evaluated as a minimum value is determined the an abnormal contact radial position.

6. The control value setting method of the thermal actuator according to claim 4, wherein the curve fitting is performed, by the control unit of the magnetic disk device, by excluding a value of a radial position sequentially for each of the radial positions to evaluate a sum of the Z value of the RMS of the fitting residual and the Z value which is a distance from a correlation between coefficients of the function, and a radial position at which the sum of the Z values is evaluated as a minimum value is determined as the abnormal contact radial position.

* * * * *